US011312047B2

(12) United States Patent
Francois et al.

(10) Patent No.: US 11,312,047 B2
(45) Date of Patent: Apr. 26, 2022

(54) METHOD FOR MAKING A SMART BRACELET PROVIDED WITH AN ELECTRONIC COMPONENT INSERT

(71) Applicant: The Swatch Group Research and Development Ltd, Marin (CH)

(72) Inventors: Nicolas Francois, Neuchatel (CH); Claire Rannoux, Morges (CH); Cedric Nicolas, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 267 days.

(21) Appl. No.: 16/466,324

(22) PCT Filed: Oct. 17, 2017

(86) PCT No.: PCT/EP2017/076396
§ 371 (c)(1),
(2) Date: Jun. 4, 2019

(87) PCT Pub. No.: WO2018/108354
PCT Pub. Date: Jun. 21, 2018

(65) Prior Publication Data
US 2020/0031029 A1 Jan. 30, 2020

(30) Foreign Application Priority Data
Dec. 15, 2016 (EP) .................................... 16204485

(51) Int. Cl.
*B29C 45/00* (2006.01)
*A44C 5/14* (2006.01)
(Continued)

(52) U.S. Cl.
CPC ............ *B29C 45/0017* (2013.01); *A44C 5/14* (2013.01); *A44C 5/0015* (2013.01); *A44C 5/0076* (2013.01);
(Continued)

(58) Field of Classification Search
CPC ..... B29C 45/0017; A44C 5/14; A44C 5/0015; A44C 5/0076; A44C 5/0053;
(Continued)

(56) References Cited

U.S. PATENT DOCUMENTS 4,110,139 A * 8/1978 Mashida ............... A44C 5/0053
156/209
5,891,528 A * 4/1999 Turek ..................... H05K 3/143
427/448

(Continued)

FOREIGN PATENT DOCUMENTS

| CN | 1325041 A | 12/2001 |
| CN | 103249572 A | 8/2013 |

(Continued)

OTHER PUBLICATIONS

English abstract of CN 206833157 of Hong (Year: 2018).*

(Continued)

*Primary Examiner* — Jason L Vaughan
(74) *Attorney, Agent, or Firm* — Oblon, McClelland, Maier & Neustadt, L.L.P.

(57) ABSTRACT

A method for making a bracelet provided with an electronic component insert, the method includes fabricating a basic, flexible support for an insert in the form of a band, making conductive paths on the flexible support or in the flexible support, disposing on the flexible support various electronic components connected to the conductive paths, and coating the electronic components disposed on the flexible support with a transparent or opaque protective layer to finish the insert of the bracelet.

17 Claims, 2 Drawing Sheets

(51) Int. Cl.
  *B33Y 30/00* (2015.01)
  *B33Y 70/00* (2020.01)
  *B33Y 80/00* (2015.01)
  *A44C 5/00* (2006.01)
  *G06F 1/16* (2006.01)
(52) U.S. Cl.
  CPC ............... *B33Y 30/00* (2014.12); *B33Y 70/00* (2014.12); *B33Y 80/00* (2014.12); *G06F 1/163* (2013.01)
(58) Field of Classification Search
  CPC ...... A44C 5/0007; B33Y 30/00; B33Y 70/00; B33Y 80/00; G06F 1/163; G04G 21/00; G04G 21/04
  See application file for complete search history.

(56) References Cited

U.S. PATENT DOCUMENTS

| | | | | |
|---|---|---|---|---|
| 9,292,008 | B1* | 3/2016 | Ahamed | H04B 1/3888 |
| 2001/0043513 | A1 | 11/2001 | Grupp | |
| 2002/0068873 | A1* | 6/2002 | Nissila | A61B 5/681 |
| | | | | 600/509 |
| 2010/0156278 | A1* | 6/2010 | Chichak | C07F 15/0033 |
| | | | | 313/504 |
| 2012/0276390 | A1* | 11/2012 | Ji | C08K 3/34 |
| | | | | 428/412 |
| 2014/0078694 | A1* | 3/2014 | Wissmar | G04G 21/025 |
| | | | | 361/749 |
| 2016/0231712 | A1 | 8/2016 | Ahamed et al. | |

FOREIGN PATENT DOCUMENTS

| | | | | |
|---|---|---|---|---|
| CN | 206649285 U | * | 11/2017 | ............. G04B 19/12 |
| CN | 206833157 U | * | 1/2018 | ............. G04B 19/32 |
| JP | 63-105096 U | | 7/1988 | |
| JP | 11-220245 A | | 8/1999 | |
| JP | 2000-259577 A | | 9/2000 | |
| JP | 2001-24343 A | | 1/2001 | |
| JP | 2002-90479 A | | 3/2002 | |
| JP | 2013-546332 A | | 12/2013 | |
| JP | 2015-138476 A | | 7/2015 | |
| WO | WO 2012/056416 A1 | | 5/2012 | |
| WO | WO 2016/125034 A1 | | 8/2016 | |

OTHER PUBLICATIONS

English abstract of CN 206649285 of Hong (Year: 2017).*
Combined Chinese Office Action and Search Report dated Jun. 28, 2020 in Chinese Patent Application No. 201780077144.9 (with English translation), 12 pages.
"Plastic Equipment and Processing Technology", Edited by Fritsche from Germany, Hunan Science and Technology Press, Dec. 2014, pp. 353-356.
"Tribological Materials and Surface Engineering", Edited by Chengbiao Wang, et al., National Defence Industry Press, Feb. 2012, pp. 455-460.
Dictionary of Modern Materials Science and Engineering, Edited by Hengde Li, Shandong Science and Technology Press, Aug. 2001, p. 606.
Korean Office Action dated Oct. 30, 2020 in Korean Patent Application No. 10-2018-7016450 with English translation, 12 pages.
Japanese Office Action dated Dec. 8, 2020 in Japanese Patent Application No. 2019-529539 (with English translation), 9 pages.
International Search Report dated Jan. 25, 2018 in PCT/EP2017/076396 filed Oct. 17, 2017.
Hueske, M. et al., "Laser Supported Activation and Additive Metallization of Thermoplastics for 3D-MIDS," Proceedings of the 3$^{rd}$ Lane 2001, Aug. 28-31, 2001, 12 pages, XP055013109.

* cited by examiner

METHOD FOR MAKING A SMART BRACELET PROVIDED WITH AN ELECTRONIC COMPONENT INSERT

CROSS REFERENCE TO RELATED APPLICATIONS

This application is a United States national stage application of International Application No. PCT/EP2017076396, filed Oct. 17, 2017, which designates the United States, and claims priority to European Patent Application No. 16204485.3, filed Dec. 15, 2016 and the entire contents of each of the above applications are hereby incorporated herein by reference in entirety.

FIELD OF THE INVENTION

The invention relates to a method for making a smart bracelet or strap provided with an electronic component insert.

The invention also relates to the bracelet obtained by the bracelet making method.

BACKGROUND OF THE INVENTION

Conventionally, watch bracelets or straps are made of leather, synthetic material, fabric, rubber-like material or metal. The bracelets also include an insert disposed inside a lining or sheath or between an upper band and a lower band that are subsequently joined to each other. This insert has a mainly mechanical and flexible function.

In the case of a leather bracelet, the insert is formed of ripstop reinforcement and padding made of leather and nonwoven fabric to give the bracelet a projecting shape. A leather lining is also provided, and a leather or synthetic upper piece. The upper piece is 'remborded' or fully wrapped around the lining, which makes it possible to obtain a very resistant bracelet.

According to a variant, the bracelet has an upper piece which is only turned over the sides of the bracelet and is thus of the 'semi-remborded' or turned edge type. The semi-remborded or remborded edge bracelet is made using a mould and a platen press.

It is also possible to envisage a cut edge leather bracelet, wherein all the layers are bonded to each other. A preform can then be cut to the shape of each of bracelet strand by a press. The edges of the bracelet are then protected using an edge paint or lacquer. However, the insert of this type of bracelet is only intended as flexible ripstop reinforcement.

At present, electronic components can be integrated in the bracelet, but it is noted that this makes it difficult to ensure adequate protection from different environmental conditions or from humidity or perspiration when the watch is worn. Several watches have been proposed with a bracelet provided with electronic components for wireless connection to another device, such as a mobile telephone or other device. However, protection of the electronic components remains inadequate, which constitutes a drawback. Moreover, the overall thickness of the bracelet is often too high, and the electronic components remain visible, which is also detrimental to the aesthetics of the bracelet.

Reference can be made in this regard to French Patent Application No. FR 2 641 092 A2, which discloses a watch bracelet. The bracelet includes a portion for electrical connection to the watch case, and a set of electronic components, which are at least an integrated circuit and an energy source. However, adequate protection of the electronic components against environmental conditions is not provided, which constitutes a drawback. The electronic components also remain visible inside the bracelet, which is detrimental to the aesthetic appearance of the bracelet.

Patent Application No. WO 2016/125034 A1 discloses a conventional bracelet, in which several electronic components are integrated along one or both of the bracelet strands. These electronic components are not protected against environmental conditions and against shocks, which is a drawback.

SUMMARY OF THE INVENTION

It is an object of the present invention to overcome the aforementioned problems of the state of the art by proposing a method for making a smart bracelet or strap, provided with an insert whose electronic components are well protected from environmental conditions, and which is of low thickness.

To this end, the invention therefore concerns a method for making a bracelet provided with an electronic component insert, the method the comprising:

fabricating a basic, flexible support for an insert in the form of a band, said flexible support being made of plastic material or of thermoplastic material obtained by moulding in a mould adapted to the shape of the bracelet, and including at least two bands disposed one on top of the other or side-by-side, one band having a technical function and the other band having a decorative function, making conductive paths on the flexible support or in the flexible support, disposing on the flexible support various electronic components connected to the conductive paths, and coating the electronic components disposed on the flexible support with a transparent or opaque protective layer to finish the insert of the bracelet.

Particular steps of the method for making the smart bracelet are defined in the dependent claims 2 to 14.

One advantage of the method for making a smart bracelet lies in the fact that the electronic component insert is obtained, in the final three-dimensional shape of the bracelet, with protection of the electronic components from perspiration during wear of the watch or bracelet from humidity in general, and from various mechanical shocks and various environmental conditions. Further, the overall thickness of the insert produced by plastronics or MID (moulded interconnected device) technology is sufficiently reduced to be able to replace a conventional reinforcement insert inside a bracelet lining made of leather or synthetic material without increasing the conventional thickness of such a bracelet.

The invention also concerns a bracelet made according to the bracelet making method wherein the bracelet includes an electronic component insert, which includes a flexible support, conductive paths, electronic components connected to the conductive paths and a protective layer on the electronic components and the flexible support, and wherein the insert is disposed inside a sheath or between an upper band and a lower band of at least one strand of the bracelet, or coated with a vulcanized elastomer or with a silicone or with a crosslinked polyurethane, and wherein the flexible support of the insert includes three bands disposed one on top of the other or side-by-side, wherein a central band is phosphorescent, and wherein two lateral bands are in a fluorescent colour.

Specific embodiments of the bracelet are defined in the dependent claims 16 to 17.

BRIEF DESCRIPTION OF THE DRAWINGS

The objects, advantages and features of the method for making a smart bracelet provided with an electronic component insert will appear more clearly in the following description, through the drawings, in which.

DETAILED DESCRIPTION OF THE INVENTION

In the following description, all those electronic components mounted inside the bracelet, which are well known to those skilled in the art in this technical field will be described only in a simplified manner. The electronic components may include a microprocessor, an oscillator, sensors for measuring physical parameters, a wireless communication circuit, a flexible battery, a display device, for example of the OLED type. The electronic component insert is defined as an insert of the type produced by plastronics technology.

FIGS. 1a to 1d represent side views of various steps for making an insert 1' of the plastronics type with the assembly of several electronic components for a bracelet, such as a watch bracelet. The insert can be composed of a flexible plastic support. This support can be in various colours, with a hardness on the order of 30 Shore A to 90 Shore A and resistance to at least 500 positive and negative bending cycles at 180°. It must resist a traction force of more than 250 N. It has good chemical resistance to adhesives and solvents, to perspiration and to water, and to cosmetics. It must also have good chemical compatibility with chloroprene and polyurethane adhesives. The material used for the plastic is transparent to electromagnetic waves.

Figure 1A:
FIGS. 1a to 1d represent various steps of the method for making an electronic component insert for a bracelet according to the invention.

To obtain the smart bracelet provided with an electronic component insert 1', it is first important to make a flexible support 2 in the form of a band of low thickness, seen in FIG. 1a. Flexible support band 2 must be made of flexible plastic material. This flexible support 2 is a basic part of an electronic component insert 1' devised to be able to be placed inside a traditional sheath or between an upper band and a lower band of at least one strand of a final bracelet or coated with a vulcanized elastomer of the bracelet as explained hereinafter.

In an advantageous method of the invention, this flexible support 2 forms the base of the printed circuit board. It is made in the form of a band in a first step of the method using a plastic or thermoplastic material, which will then be subjected to selective plasma metallization (Plasmacoat 3D process). It can be made by extrusion of a thermoplastic material through a die adapted to the shape of the bracelet or of at least one of the bracelet strands. It can also be made by injection moulding. The flexible support may be a polyurethane thermoplastic with a hardness of 65 Shore A to 90 Shore A. It may also be another thermoplastic elastomer that meets the desired requirements. Vulcanized elastomers may also be used, such as a nitrile rubber or a fluorinated rubber, a silicone or a crosslinked polyurethane, which will be implemented by extrusion processes.

In another advantageous method, flexible, moulded support 2 can contain a special additive (LDS Laser Direct structuring additive) in the form of an organic metal complex, in order to perform a selective metallization process via the MID (Molded Interconnected Device) process developed by LPKF with a physicochemical reaction induced, in particular, by a focused laser beam. This method is described in Patent Application No. WO 2012/056416 A1.

Figure 1B:

In a second step of the method seen in FIG. 1b, conductive paths 3 are made on flexible support 2 or in flexible support 2, so that the electronic components of the insert can subsequently be positioned and connected. Conductive paths 3 can either be obtained by a process equivalent to the PlasmaCoat 3D process, or by activation by means of a focused laser beam L, as in the MID process developed by LPKF, which is programmed in accordance with the electrical connection pattern of the components. To perform this operation, reference can be made to the article entitled 'Laser supported activation and additive metallization of thermoplastics for 3D-MIDS" by M. Hüske, J. Kickelhain, J. Müller, G. Esser, Proceedings of the 3rd LANE 2001, Aug. 28-31, 2001, Erlangen, Germany, which is incorporated herein by reference.

It will be noted that the PlasmaCoat 3D process offers an advantage, since it avoids galvanic treatment of the component, to deposit copper on the conductive paths.

Figure 1C:
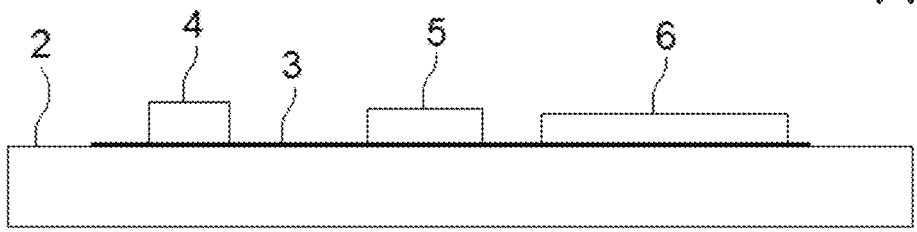

In the third step shown in FIG. 1c, the various electronic components 4, 5, 6 are placed, secured and electrically connected on the surface of flexible support 2, which includes conductive paths 3. To make a plastronics insert, there may be provided one or more sensors 4, a microprocessor 5 and an energy source, for example a flexible battery 6. Sensors 4 may be a pressure sensor, a temperature sensor, a magnetic field sensor, an acceleration sensor or another type of sensor. An NFC, Bluetooth or other wireless communication circuit, a display device, for example an OLED, an oscillator and switches may also be provided.

Figure 1D:
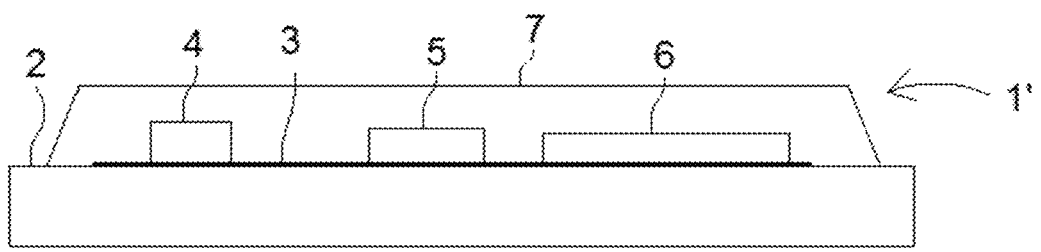

Finally, in the fourth step shown in FIG. 1d, electronic components 4, 5, 6 are coated with a protective layer 7, which may be transparent or opaque. This protective layer 7 protects all of electronic components 4, 5, 6 from environmental conditions, and from perspiration, when the bracelet is worn on the wrist, from humidity, cosmetics and mechanical shocks. Protective layer 7 is made with a thermoplastic elastomer material resistant to the environment and to mechanical shocks, such as an overmoulded polyurethane on plastronic insert 1'. It can also be made with an elastomer material, such as a silicone, a fluorinated elastomer, a polyurethane.

It is also to be noted that protective layer 7 can also have an aesthetic function. In this regard, it may contain fillers, such as pigments having specific effects.

In an advantageous case, there may also be a combination of thermochromic pigments and fillers improving the thermal conductivity of protective layer 7. The thermal activity of some electronic components can then change the colour of protective layer 7.

In another advantageous case, before protective layer 7, a special resin able to be crosslinked by thermal or light radiation can be poured over some sensitive electronic components. This protects them from subsequent aggressive manufacturing operations. It may be a thermal, electrical or electromagnetic insulation resin.

Figure 3:
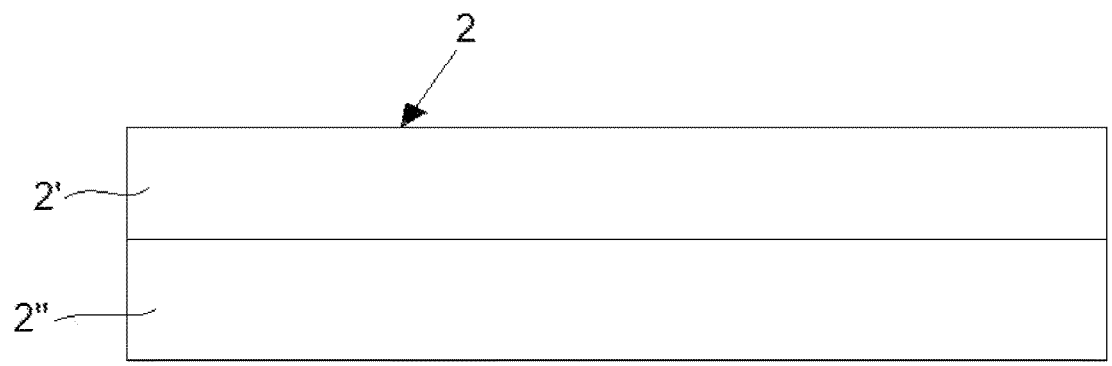
FIG. 3 represents two side-by-side bands.

In another variant, flexible support 2 can be made by co-extrusion of several materials and can include at least two bands, 2' and 2" shown in FIG. 3, wherein one band has a technical function and another band has a technical function.

It is also possible, for example, to have three bands disposed one on top of the other or side-by-side seen from above. In this latter case, a central band is phosphorescent and two lateral bands are in a fluorescent colour or pearlescent or variochromic. The die head of the equipment used to make the flexible support allows a slightly concave profile to be made. This then allows the central band to be used to create decorations which illuminate the bracelet at night and thus make the information to be displayed legible. The fluorescent bands on the sides can be used to create decorations visible in daylight.

It is also to be noted that flexible support 2 can be composed of several injection moulded or extruded materials, and uses thermochromic materials, which change colours at different temperature thresholds. This makes it possible to create a smart decoration that reacts during operation of the plastronic insert.

Shape memory materials can also be used to make flexible support 2, like DESMOPAN 2795A SMP, allowing different three-dimensional decorations to be made by thermoforming processes. A material that contains fillers can also be used to improve the comfort of the wearer of the bracelet (encapsulated fragrances, antibacterial, anti-perspiration . . . ).

Once plastronic insert 1' is finished, this insert can be coated with a vulcanized elastomer layer to obtain the bracelet. Insert 1' can also be placed inside a sheath made of leather or synthetic or woven material, or between an upper band and a lower band, in particular made of leather, which are fixed to each other to obtain the bracelet.

Figure 2:
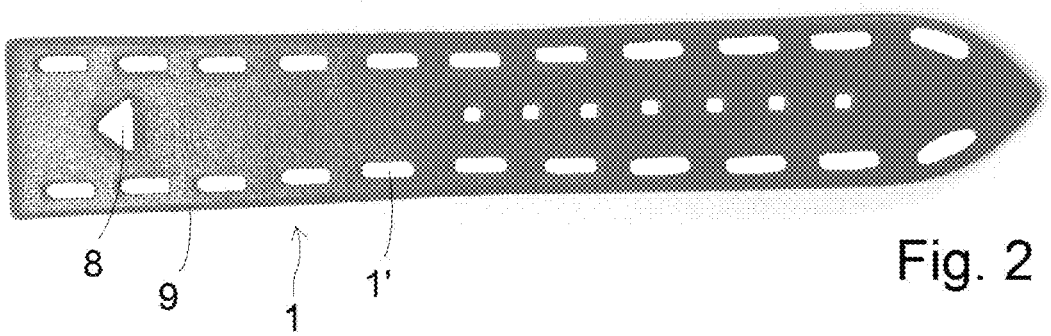
FIG. 2 represents a bracelet strand provided with an insert of the plastronics type according to the invention.

FIG. 2 represents only one strand of a bracelet 1. Plastronic insert 1' is placed inside a leather lining 9. As previously indicated, once finished, insert 1' can be placed inside a leather sheath 9 or between an upper band and a lower band made of leather. Openings can be made in leather lining 9 or in the upper piece of the bracelet and reveal either the flexible support or the protective layer of plastronic insert 1'. For example, there is proposed a central opening 8 in bracelet 1 in proximity to the attachment thereof to a watch case, to obtain a phosphorescent decoration.

Figure 4:
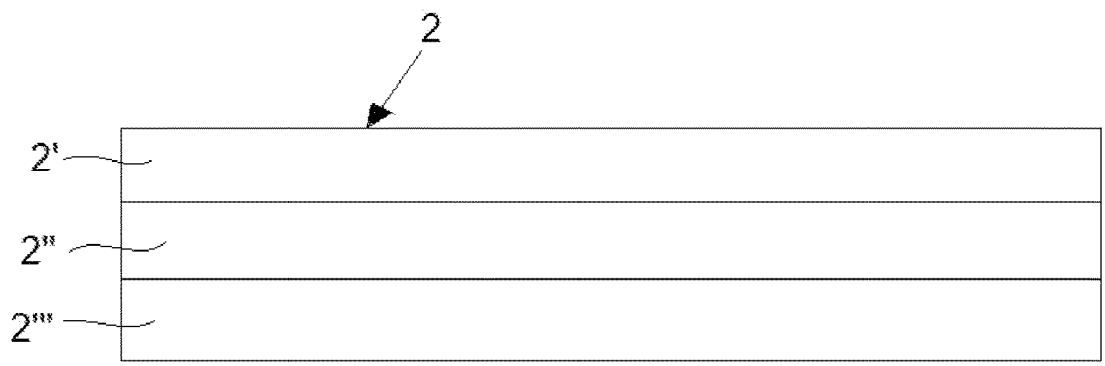
FIG. 4 represents three side-by-side bands.

In the case of a flexible support of insert 1' composed of three side-by-side bands, 2' 2", and 2''' shown in FIG. 4, the central band is phosphorescent, and the two lateral bands are fluorescent in order to make information to be displayed visible, for example, through the openings at the edge of bracelet 1.

From the description that has just been given, several variants of the method for making a bracelet provided with a plastronic insert can be devised by those skilled in the art without departing from the scope of the invention defined by the claims. The conductive paths on the flexible support of the insert can be made by structuring a metal layer deposited on a surface of the flexible support or by another type of structured conductive layer. The bracelet can be made in the form of a loop to be worn on the wrist. It is also possible for the plastronic insert to be placed in a bracelet with metal links and to have an electrical connection with electronic components disposed inside a watch case.

The invention claimed is:

1. A method for making a bracelet provided with an electronic component insert, the method comprising:
   fabricating a basic, flexible support for the electronic component insert in a form of a band, said flexible support being made of plastic material or of thermoplastic material obtained by molding in a mold adapted to a shape of the bracelet, and including at least two bands disposed one on top of the other or side-by-side, one of the at least two bands having a technical function and the other of the at least two bands having a decorative function;
   making conductive paths on the flexible support or in the flexible support;
   disposing an electronic component into the electronic component insert such that the electronic component is connected to and placed on one of the conductive paths; and
   coating the electronic component disposed in the electronic component insert with a transparent or opaque protective layer to finish the electronic component insert of the bracelet, wherein
   the conductive paths are sandwiched between the flexible support and the electronic component.

2. The method for making a bracelet according to claim 1, wherein the flexible support is obtained by injection molding or extrusion of a thermoplastic material or of several plastic or thermoplastic materials in an appropriate mold.

3. The method for making a bracelet according to claim 1, wherein
   the band with a technical function provides thermal conductivity for the electronic component or electromagnetic shielding, and
   the band with a decorative function is in a fluorescent color or pearlescent or variochromic or phosphorescent.

4. The method for making a bracelet according to claim 1, wherein the flexible support contains an additive in a form of an organic metal complex.

5. The method for making a bracelet according to claim 4, wherein the conductive paths are obtained on or in the flexible support or in a layer on the flexible support by activation of a physicochemical reaction induced by a focused laser beam, which is programmed according to electrical connection pattern of the components.

6. The method for making a bracelet according to claim 1, wherein the electronic component insert is disposed and secured inside a sheath or between an upper band and a lower band of the bracelet.

7. The method for making a bracelet according to claim 6, wherein the electronic component insert is disposed and secured inside a sheath or between an upper band and a lower band of at least one strand of a wristwatch bracelet.

8. The method for making a bracelet according to claim 6, wherein the sheath or the upper and lower bands of the bracelet are made of leather or of synthetic or woven material.

9. The method for making a bracelet according to claim 1, wherein the conductive paths are made by a selective plasma spraying process.

10. The method for making a bracelet according to claim 1, wherein the electronic component insert is coated with a vulcanized elastomer, which is one of a nitrile rubber or a fluorinated rubber, or with a silicone or with a crosslinked polyurethane.

11. The method for making a bracelet according to claim 1, wherein the protective layer is made with a thermoplastic elastomer resistant to environment and to mechanical shocks.

12. The method for making a bracelet according to claim 11, wherein the thermoplastic material is transparent to electromagnetic waves.

13. The method for making a bracelet according to claim 11, wherein the protective layer is made of overmolded polyurethane.

14. The method for making a bracelet according to claim 11, wherein the protective layer includes a combination of thermochromic pigments and fillers, to allow a color of the protective layer to change according to thermal activity of the electronic component.

15. A bracelet obtained by the method according to claim 1, wherein
- the bracelet includes an electronic component insert, which includes a flexible support, conductive paths, electronic components connected to the conductive paths and a protective layer on the electronic components and the flexible support,
- the electronic component insert is disposed inside a sheath or between an upper band and a lower band of at least one strand of the bracelet, or coated with a vulcanized elastomer or with a silicone or with a crosslinked polyurethane,
- the at least two bands including three bands disposed one on top of the other or side-by-side,
- a central band is phosphorescent, and
- two lateral bands are in a fluorescent color.

16. The bracelet according to claim 15, wherein
- the electronic component insert is confined inside a lining made of leather or of synthetic or woven material, and
- a central opening is provided in the lining on the central phosphorescent band of the flexible support.

17. The bracelet according to claim 15, wherein
- the electronic component insert is confined inside a lining made of leather or of synthetic or woven material, and
- openings are provided in one part of an edge of the lining on the fluorescent bands of the flexible support in order to display information.

* * * * *

UNITED STATES PATENT AND TRADEMARK OFFICE
CERTIFICATE OF CORRECTION

PATENT NO. : 11,312,047 B2
APPLICATION NO. : 16/466324
DATED : April 26, 2022
INVENTOR(S) : Francois et al.

It is certified that error appears in the above-identified patent and that said Letters Patent is hereby corrected as shown below:

On the Title Page

On Page 2, Column 2, Item (56), under "OTHER PUBLICATIONS", Line 15, delete "10-2018-7016450" and insert -- 10-2019-7016450 --, therefor.

On Page 2, Column 2, Item (56), under "OTHER PUBLICATIONS", Line 15, delete "12" and insert -- 13 --, therefor.

Signed and Sealed this
Twentieth Day of September, 2022

Katherine Kelly Vidal
*Director of the United States Patent and Trademark Office*